(12) United States Patent
Morris et al.

(10) Patent No.: US 8,327,485 B1
(45) Date of Patent: Dec. 11, 2012

(54) COUNTERBALANCE FOR A FOLD OUT RAMP

(75) Inventors: Donald Morris, Littleton, CO (US); David Johnson, Modesto, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 28 days.

(21) Appl. No.: 13/107,741

(22) Filed: May 13, 2011

(51) Int. Cl.
*E01D 1/00* (2006.01)

(52) U.S. Cl. ............... 14/69.5; 14/71.1; 414/537; 74/49

(58) Field of Classification Search .......... 17/69.5–71.5; 414/537; 74/49, 53
See application file for complete search history.

(56) References Cited

U.S. PATENT DOCUMENTS

| | | | | |
|---|---|---|---|---|
| 4,137,587 A | * | 2/1979 | Rosengren | 14/71.3 |
| 4,501,042 A | * | 2/1985 | DiFonzo | 14/71.3 |
| 4,503,722 A | * | 3/1985 | Suzuki et al. | 74/96 |
| 4,703,534 A | * | 11/1987 | Pedersen | 14/71.1 |
| 5,111,912 A | * | 5/1992 | Kempf | 187/250 |
| 5,775,232 A | * | 7/1998 | Golemis et al. | 105/458 |
| 6,843,635 B2 | * | 1/2005 | Cohn | 414/549 |
| 7,168,119 B1 | * | 1/2007 | Telford et al. | 14/71.5 |
| 8,156,595 B2 | * | 4/2012 | Budd et al. | 14/71.3 |
| 2004/0107520 A1 | * | 6/2004 | van der Heiden | 14/71.1 |

FOREIGN PATENT DOCUMENTS

WO 2012/024664 A2 2/2012

* cited by examiner

*Primary Examiner* — Raymond W Addie
(74) *Attorney, Agent, or Firm* — Christensen O'Connor Johnson Kindness PLLC

(57) ABSTRACT

A counterbalance assembly is suited for use with a fold out ramp having a ramp portion selectively movable between a stowed position, a neutral position, and a deployed position. The counterbalance includes first and second springs and a transmission element forming an endless loop. A first biasing element is coupled to the transmission element so that the first biasing element compresses the first spring when the ramp portion moves from the neutral position to the stowed position and compresses the second spring when the ramp portion moves from the neutral position to the deployed position. A second biasing element is coupled to the transmission element so that the second biasing element compresses the second spring when the ramp portion moves from the neutral position to the stowed position and compresses the first spring when the ramp portion moves from the neutral position to the deployed position.

20 Claims, 17 Drawing Sheets

COUNTERBALANCE FOR A FOLD OUT RAMP

TECHNICAL FIELD

The present disclosure relates generally to wheelchair lifts and, more particularly, to fold out ramps for vehicles.

BACKGROUND

The Americans with Disabilities Act (ADA) requires the removal of physical obstacles to those who are physically challenged. This legislation has increased public awareness and concern over the requirements of the physically challenged. Consequentially, there has been more emphasis on providing systems that assist such people to access motor vehicles, such as buses or minivans.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, and thereby preserve the life of the drive motor or even allow a smaller drive to be employed. Finally, operating systems for such fold-out ramps must have large power sources to overcome the torque placed on the hinge by the necessarily long moment arm of the fold-out ramp.

SUMMARY

A first disclosed counterbalance is suitable for use with a ramp assembly. The ramp assembly includes a ramp portion that is selectively movable between a stowed position, a neutral position, and a deployed position. The counterbalance includes a transmission element that forms an endless loop and is operably coupled to the ramp portion so that the transmission moves in a first direction when the ramp portion moves toward the stowed position, and in a second direction opposite the first direction when the ramp portion moves toward a deployed position. The counterbalance further includes first and second springs. A first biasing element is coupled to the transmission element. The first biasing element compresses the first spring when the ramp portion moves from the neutral position to the stowed position and compresses the second spring when the ramp portion moves from the neutral position to the deployed position. A second biasing element is coupled to the transmission element so that the second biasing element compresses the second spring when the ramp portion moves from the neutral position to the stowed position and compresses the first spring when the ramp portion moves from the neutral position to the deployed position.

A second disclosed counterbalance includes a transmission element forming an endless loop that is operably coupled to the ramp portion to move in a first direction when the ramp portion moves toward the stowed position, and in a second direction opposite the first direction when the ramp portion moves toward a deployed position. The counterbalance further includes first and second springs. A first biasing element is coupled to the transmission element so that the first biasing element moves a first end of the first spring toward a second end of the first spring when the ramp portion moves from the neutral position to the stowed position. When the ramp portion moves from the neutral position to the deployed position, the first biasing element moves a first end of the second spring toward a second end of the second spring. A second biasing element is coupled to the transmission element and moves the first end of the second spring toward the second end of the second spring when the ramp portion moves from the neutral position to the stowed position. When the ramp portion moves from the neutral position to the deployed position, the second biasing element moves the first end of the first spring toward the second end of the first spring.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the claimed counterbalance will now be described with reference to the accompanying drawings where like numerals correspond to like elements. The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the disclosed subject matter, as claimed. Thus, it will be apparent to one skilled in the art that aspects of the presently disclosed counterbalance may be employed with other ramp assemblies used in stationary installations, such as residential buildings and the like.

The following detailed description may use illustrative terms such as vertical, horizontal, front, rear, inboard, outboard, curbside, roadside, proximal, distal, etc. However, these terms are descriptive in nature and should not be construed as limiting. Further, it will be appreciated that embodiments of the present invention may employ any combination of features described herein.

Figure 3:
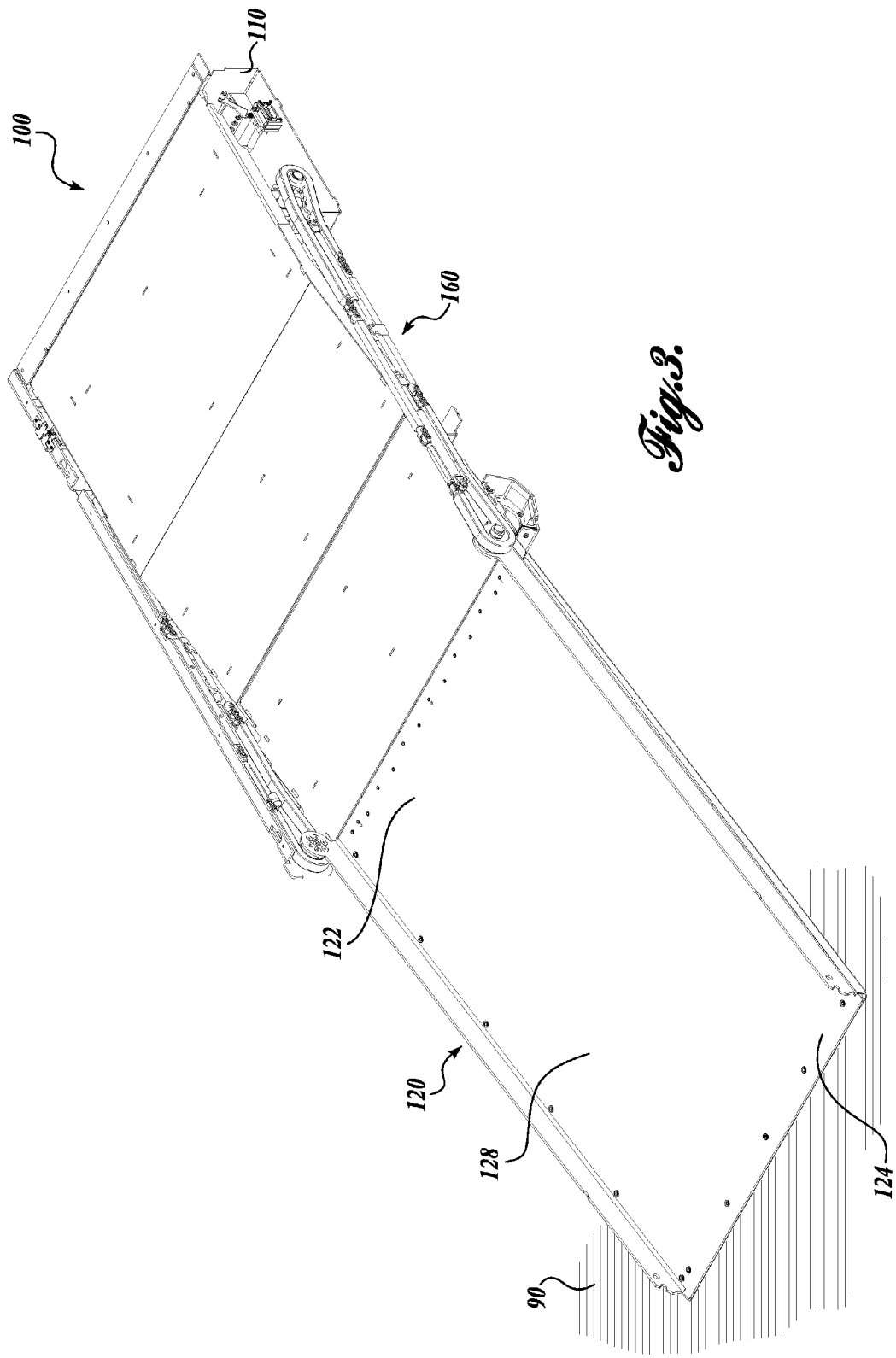
FIG. 3 shows an isometric view of the fold out ramp of FIG. 1 with the ramp portion in a deployed position.

FIGS. 1-4 illustrate an exemplary embodiment of a fold out ramp assembly 100 (hereinafter the "ramp assembly 100") suitable for use with the described counterbalance assemblies. The ramp assembly 100 is adapted to be mounted to a vehicle (not shown) having a floor, such as a bus or a van. The ramp assembly 100 includes a frame 110, a ramp portion 120, a drive assembly 140, and a counterbalance assembly 160. The ramp portion 120 is rotatably coupled to the frame 110 about a first end 122 of the ramp portion so that the ramp portion 120 is reciprocal between the stowed position (FIG. 1), a neutral position (FIG. 2), and a deployed position (FIG. 3).

Although the illustrated embodiments of the ramp assembly 100 include a frame 110, other embodiments are contemplated in which the ramp assembly 100 does not include a frame 110. When such embodiments are installed in vehicles, the ramp assembly 100 components are attached directly to the structure of the vehicle or to a suitable structure within the vehicle, thus making a frame 110 unnecessary. Similarly, when such embodiments are installed in stationary installations, such as residential buildings and the like, the ramp assembly 100 components are attached to the structure of the building or any other suitable structure within the building. Accordingly, embodiments of the described ramp assembly 100 that do not include a frame should be considered within the scope of the present disclosure.

Figure 1:
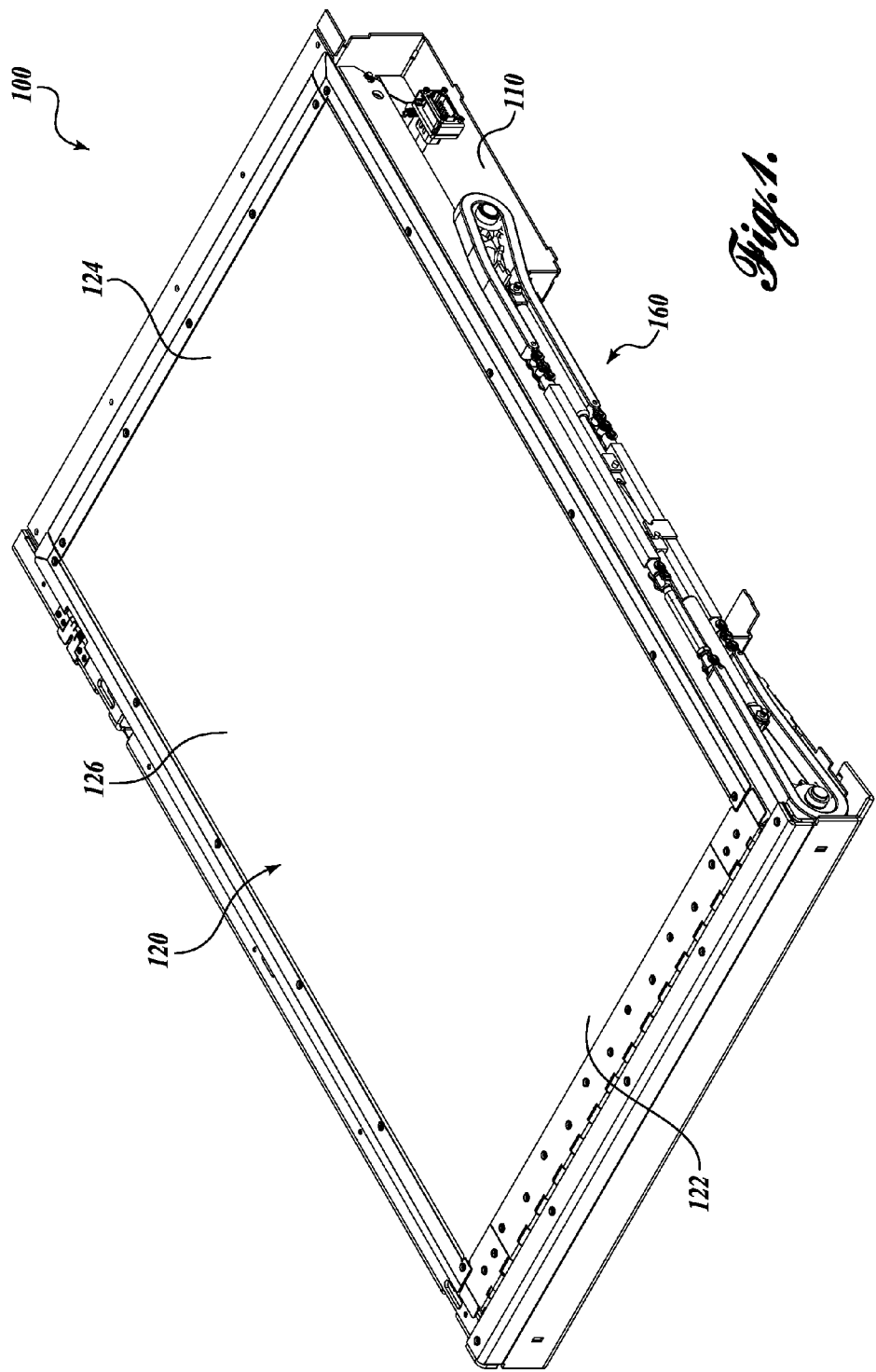
FIG. 1 shows an isometric view of a fold out ramp having a first embodiment of a counterbalance assembly, wherein a ramp portion is shown in the stowed position.
Figure 2:
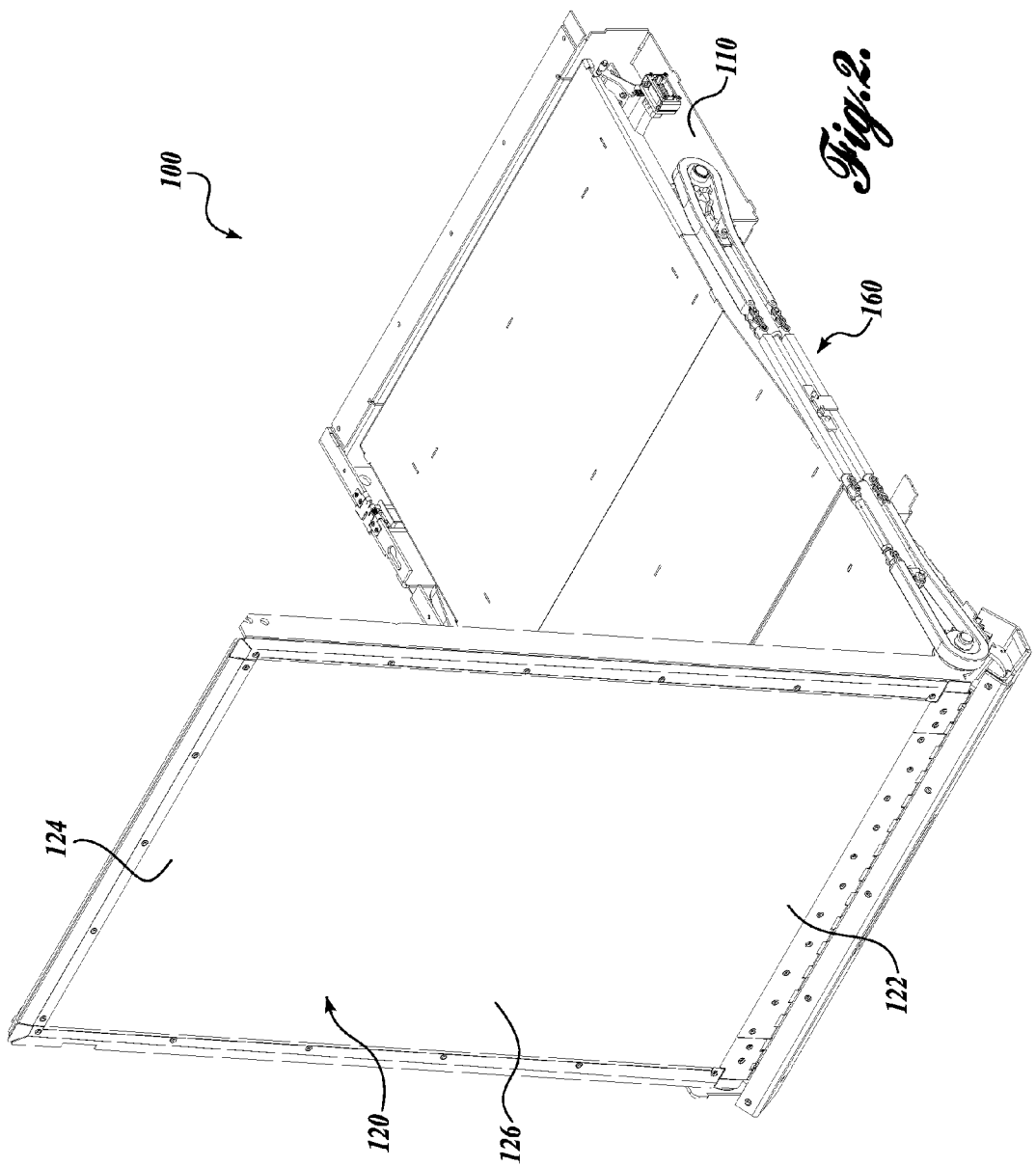
FIG. 2 shows an isometric view of the fold out ramp of FIG. 1 with the ramp portion in a neutral position.

Referring to FIG. 1, when the ramp portion 120 is in the stowed position, the first end 122 of the ramp portion 120 is outboard of a second end 124 of the ramp portion 120. When the ramp portion 120 is so positioned, the lower surface 126 of the ramp portion faces upward and is generally parallel to the floor of the vehicle, thus forming a part of the walking surface of the vehicle floor. To move from the stowed position to a deployed position, the ramp portion 120 rotates about the first end 122 until the second end 124 of the ramp portion 120 contacts an alighting surface 90. As shown in FIG. 3, when the ramp assembly is in the deployed position, the upper surface 128 of the ramp portion 120 faces generally upward and provides a sloped transition surface between the vehicle interior and the alighting surface 90.

It should be appreciated that the presently disclosed counterbalance is not limited to use with a simple, rotatable fold out ramp as described above. In this regard, the disclosed counterbalance can be used with various types of fold out ramp assemblies, including those with movable floors or linkage systems, fold out ramp assemblies wherein the axis about which the ramp portion rotates is not in a fixed location, or any other ramp assemblies wherein the ramp portion rotates from a stowed position through a neutral position to a deployed position. Adapting the disclosed counterbalance to these and other suitable ramp assemblies is contemplated and should be considered within the scope of the present disclosure.

Figure 4:
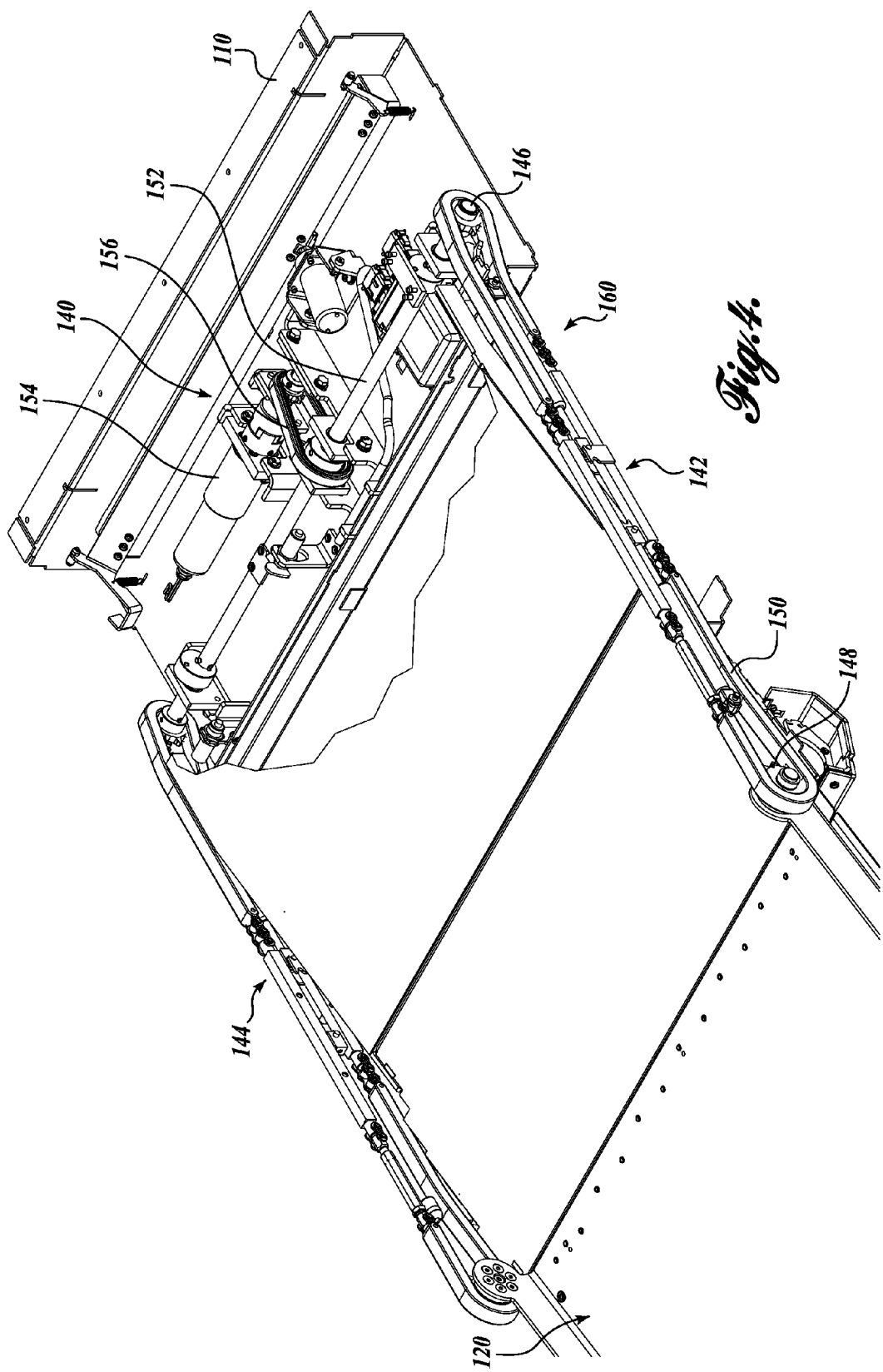
FIG. 4 shows an isometric partial cutaway view of the fold out ramp of FIG. 1 with the ramp portion in a deployed position.

Referring to FIG. 4, the drive assembly 140 actuates the ramp portion 120 to reciprocate between the stowed position and a deployed position. A forward portion 142 of the drive assembly/counterbalance combination is located on the forward side of the ramp assembly 100. A rear portion 144 of the drive assembly/counterbalance combination is similarly located on the rear side of the ramp assembly 100, wherein each element of the forward portion corresponds to a similar element of the rear portion 144. For the sake of clarity, the forward portion 142 of the drive assembly/counterbalance combination is described herein with the understanding that unless otherwise indicated, each element of the forward portion has a corresponding element on the rear portion.

Still referring to FIG. 4, the drive assembly 140 includes an inboard sprocket 146 that is rotatably coupled to the inboard end of the forward side of the frame 110. The inboard sprocket 146 is oriented to have an axis of rotation that extends in the forward/rearward direction. The drive assembly 140 also includes an outboard sprocket 148 rotatably coupled to the outboard end of the forward side of the frame 110. The outboard sprocket 148 is oriented to have an axis of rotation that is substantially parallel to the axis of rotation of the inboard sprocket 146. The outboard sprocket 148 is operably coupled to the ramp portion 120 so that rotation of the outboard sprocket in a first direction rotates the ramp portion toward the stowed position, and rotation of the outboard sprocket in a second direction rotates the ramp portion toward the deployed position.

A drive chain assembly 150 forms an endless loop that engages the teeth of the outboard sprocket 148 and the teeth of the inboard sprocket 146. The drive chain assembly 150 acts as a force transmission element so that movement of the drive chain assembly along the path of the drive chain assembly rotates the inboard sprocket 146 and the outboard sprocket 148 in tandem.

As shown in FIG. 4, a drive shaft 152 is coupled to the inboard sprocket 146. The drive shaft 152 is operatively coupled to a motor 154 by a well known transmission 156. The motor 154 is selectively operated to rotate the inboard sprocket 146, thereby driving the outboard sprocket 148 via the drive chain assembly 150. In one embodiment, a single motor 154 drives the inboard sprocket 146 of the forward portion 142 of the drive assembly 140 and also the inboard sprocket 146 of the rear portion 144 of the drive assembly 140. In another embodiment, each inboard sprocket 146 is driven by a separate motor 154. In still another embodiment, a separate drive sprocket is coupled to the motor 154 and engages the drive chain assembly 150 to actuate the ramp. It is contemplated that alternate drive assemblies can be utilized to actuate the ramp assembly, and such alternate configurations should be considered within the scope of the present disclosure.

Figure 5:
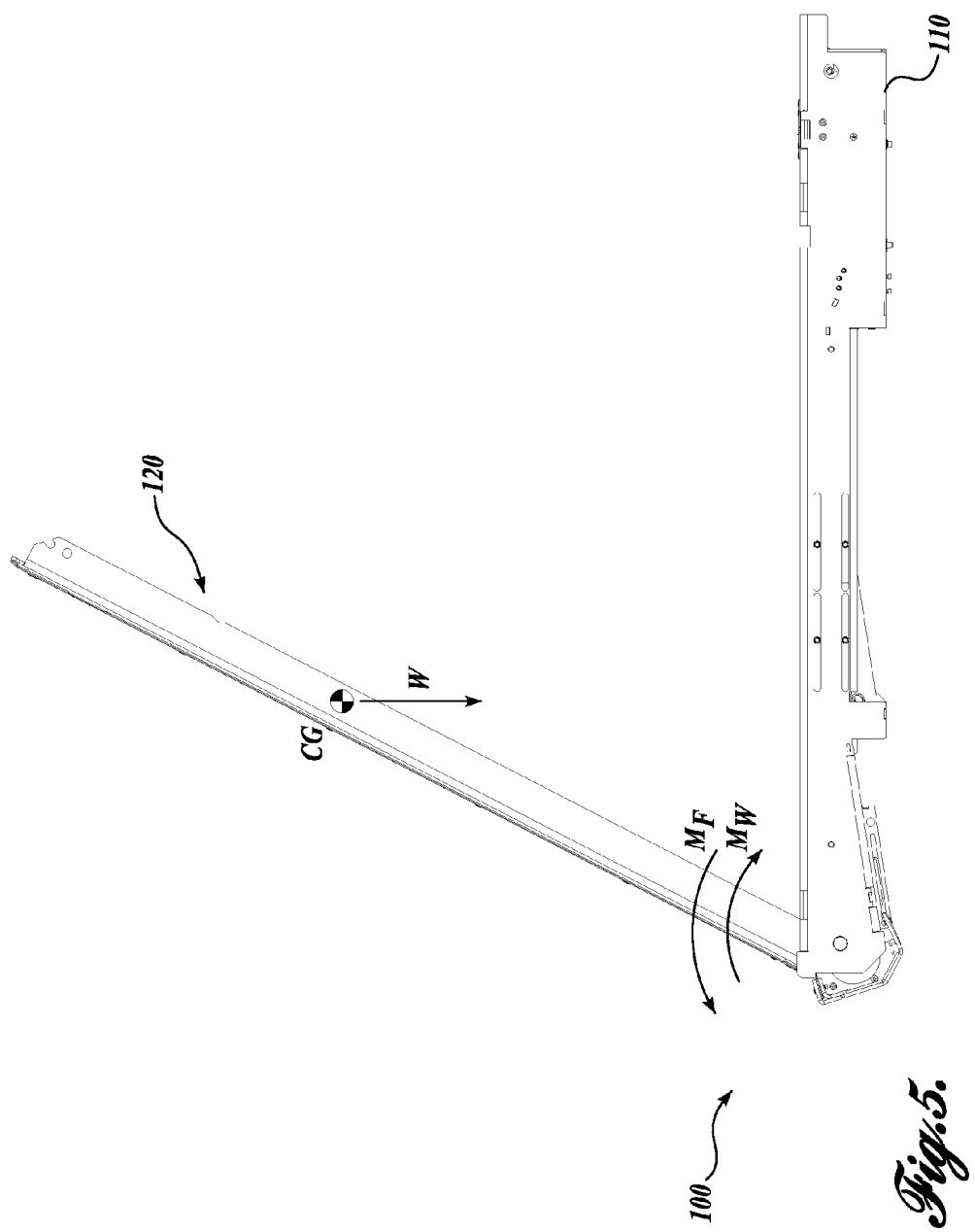
FIG. 5 shows a side view of the fold out ramp of FIG. 1 with the ramp portion located between the stowed position and the neutral position.
Figure 6:
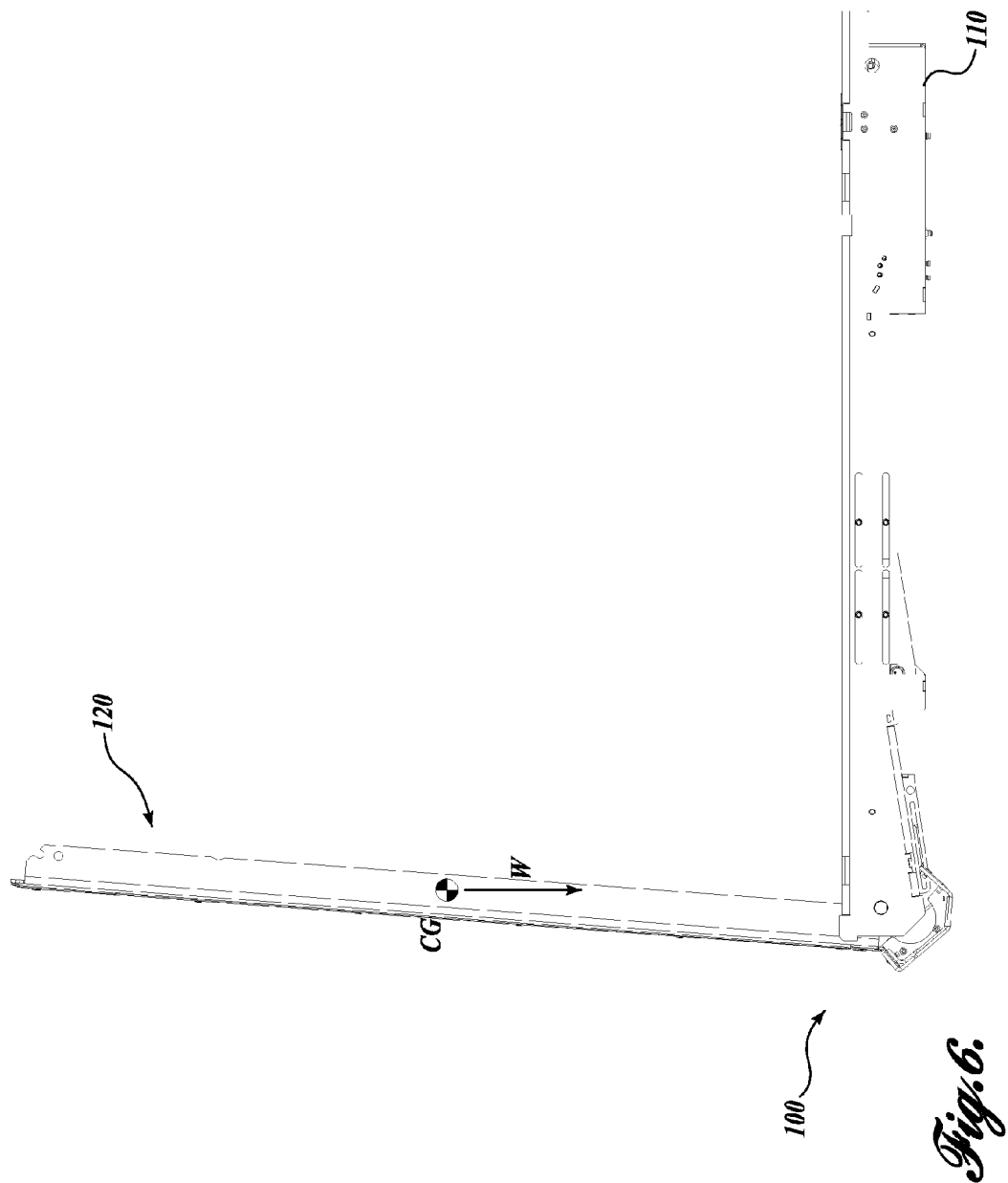
FIG. 6 shows a side view of the fold out ramp of FIG. 1 with the ramp portion located in the neutral position.
Figure 7:
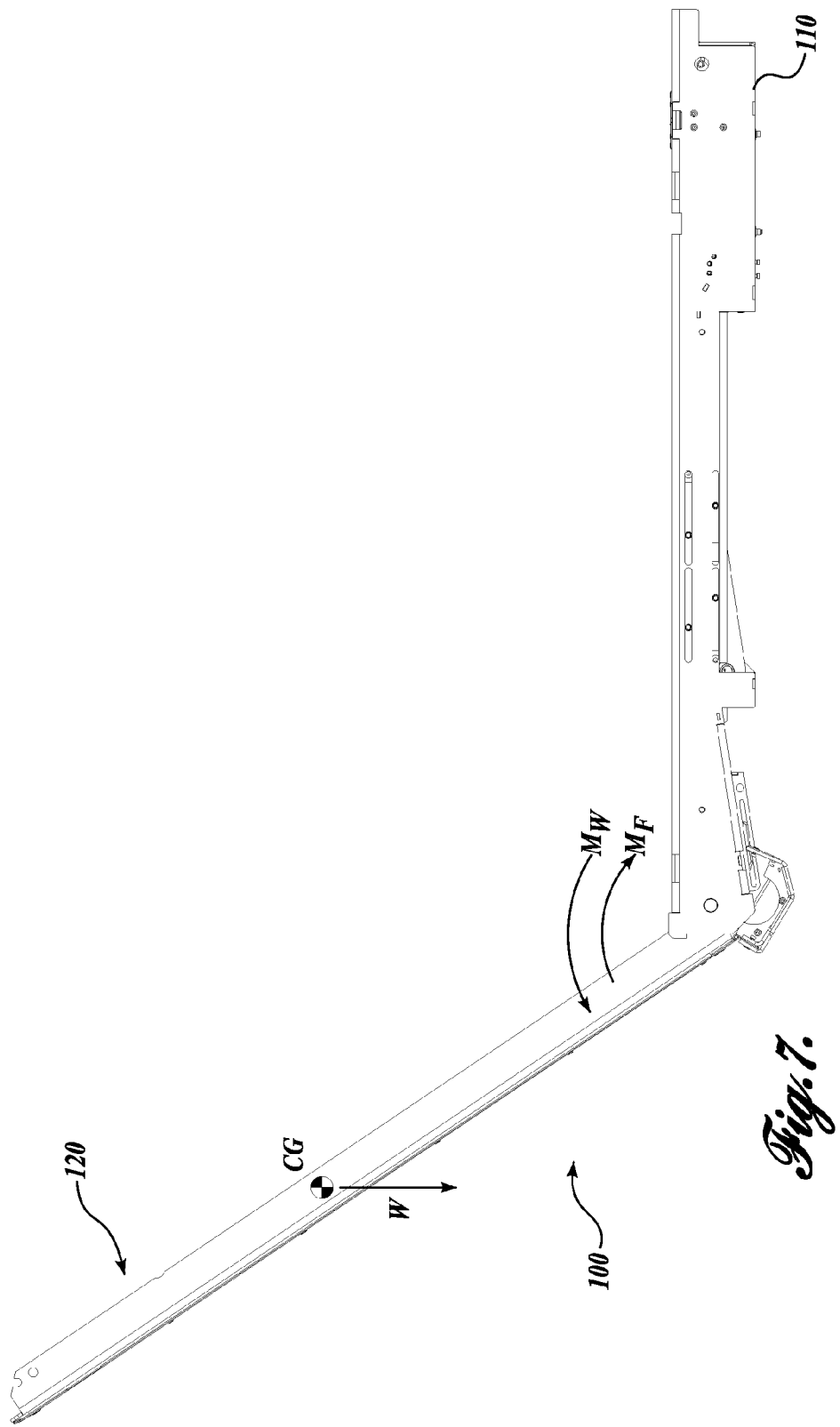
FIG. 7 shows a side view of the fold out ramp of FIG. 1 with the ramp portion located between the deployed position and the neutral position.

FIGS. 5-7 show the effect of the weight of the ramp portion 120 when the ramp portion is located between the neutral position and the stowed position (FIG. 5), when the ramp portion is in the neutral position (FIG. 6), and when the ramp portion is located between the neutral position and the deployed position (FIG. 7). Referring to FIG. 5, when the ramp is in the stowed position, the weight W of the ramp portion 120, which is idealized as a point force acting at the CG of the ramp portion 120, imparts a moment $M_W$ about the center of rotation of the ramp portion 120. Because the CG is located inboard of the center of rotation of the ramp portion 120, the moment $M_W$ tends to rotate the ramp portion 120 toward the stowed position, i.e., away from the neutral position. The moment $M_W$ is the product of the weight W of the ramp portion 120 multiplied by moment arm, which is the horizontal distance between (1) the center of rotation of the ramp portion and (2) the CG of the ramp portion. As the ramp portion moves from the neutral position toward the stowed position, the moment arm increases sinusoidally, and thus, the moment $M_W$ tending to rotate the ramp toward the stowed position also increases sinusoidally.

Referring to FIG. 6, when the ramp portion 120 is in the neutral position, the CG of the ramp portion 120 is directly above the center of rotation of the ramp portion so that the moment arm is zero. Accordingly, the weight W of the ramp portion 120 does not impart a moment $M_W$ on the ramp portion 120 when the ramp portion is in the neutral position.

Referring to FIG. 7, when the ramp portion 120 is located between the neutral position and a deployed position, the CG of the ramp portion is located outboard of the center of rotation of the ramp portion 120. Consequently, the weight W of the ramp portion 120 imparts a moment $M_W$ that tends to move the ramp portion toward the deployed position. As the ramp portion moves from the neutral position to a deployed position, the moment arm and, therefore, the moment $M_W$ increases sinusoidally until the ramp portion is approximately horizontal. As the ramp portion 120 continues to travel from the approximately horizontal position to its final deployed position, the moment arm, and thus the moment $M_W$, decreases slightly.

As shown in FIGS. 4-7, the counterbalance assembly 160 imparts a moment $M_F$ to counteract the moment $M_W$ imparted by the weight of the ramp. More specifically, the counterbalance assembly 160 provides a counterbalancing force to the outboard sprocket 148 through the drive chain assembly 150 (endless loop). Application of the counterbalancing force to the outboard sprocket 148 imparts a counterbalancing moment $M_F$ to the ramp portion 120. Because the counterbalancing moment $M_F$ opposes the moment $M_W$, the net moment on the ramp portion is reduced.

Figure 8:
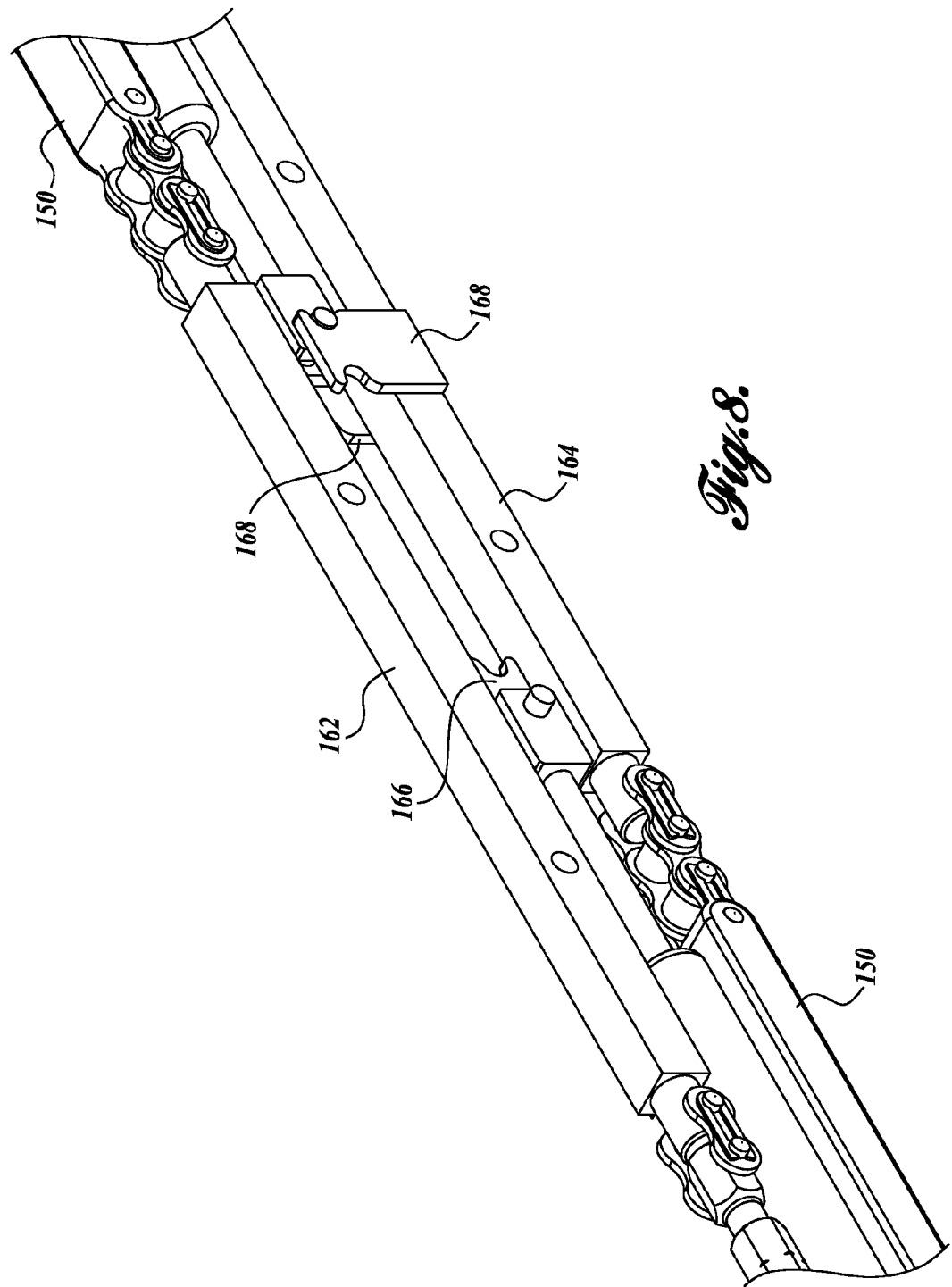
FIG. 8 shows a partial isometric view of the counterbalance assembly shown in FIG. 1.
Figure 9:
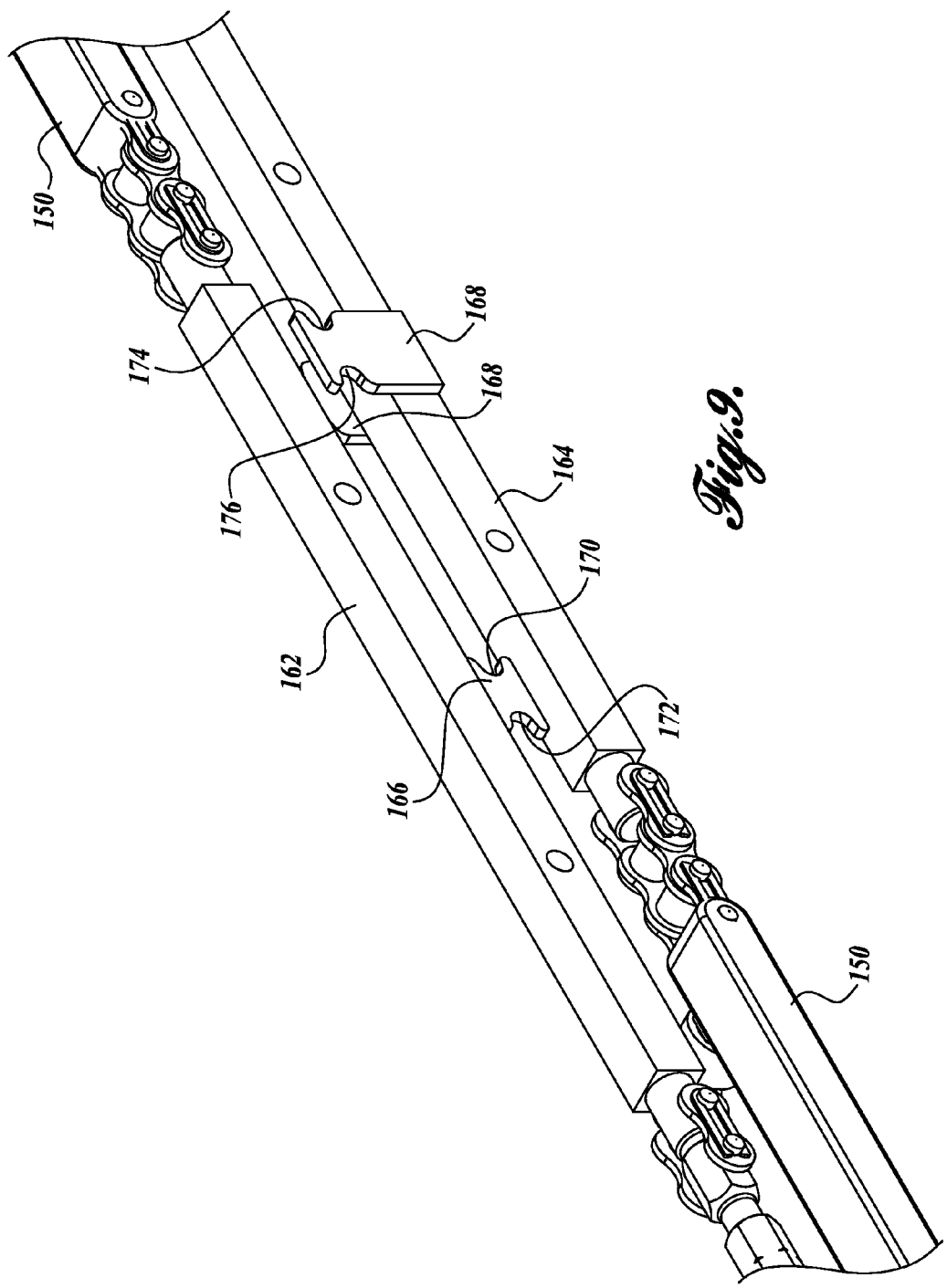
FIG. 9 shows a partial isometric view of the counterbalance assembly shown in FIG. 8.
Figure 10:
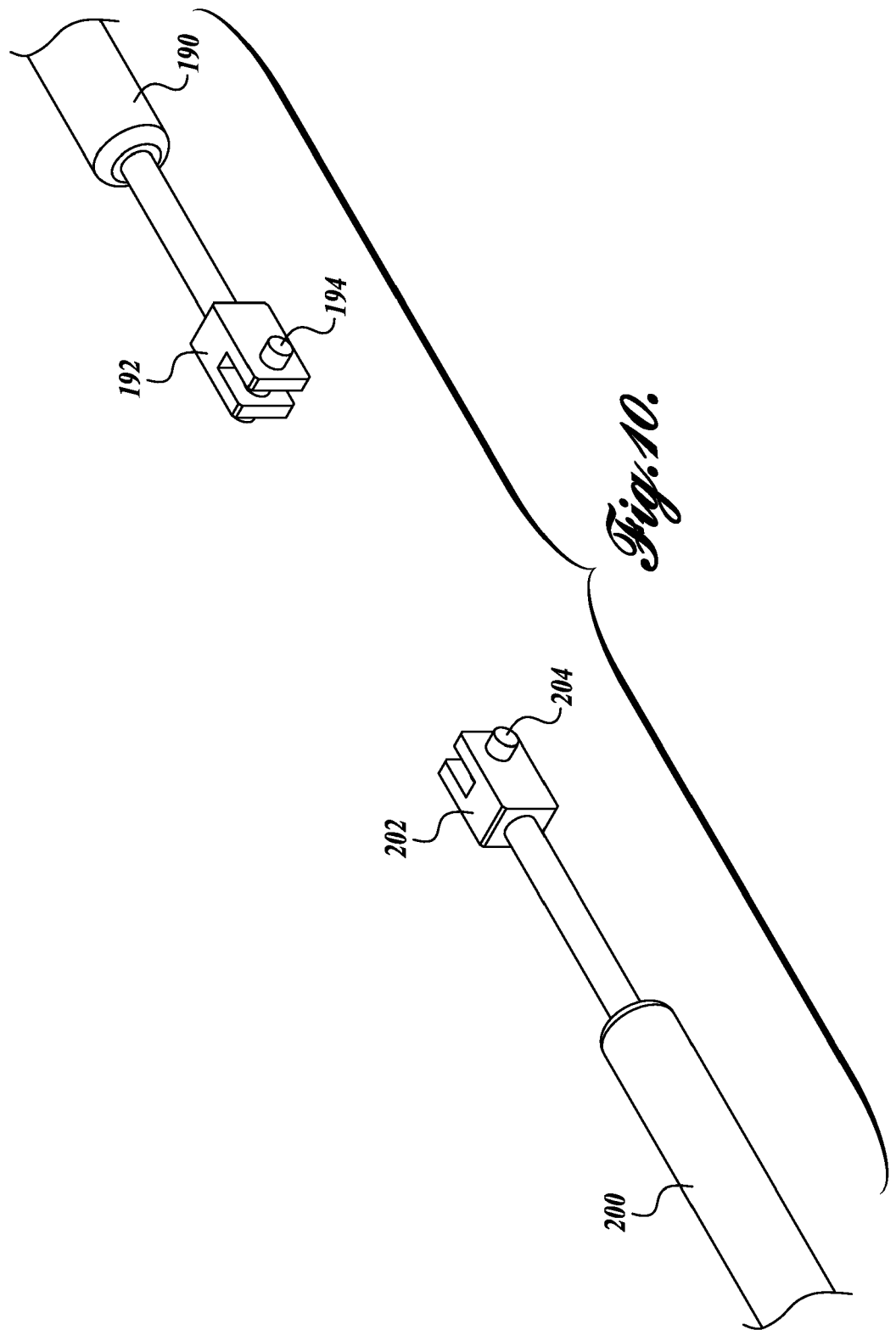
FIG. 10 shows a partial isometric view of the counterbalance assembly shown in FIG. 8.

Referring now to FIGS. 8-10, the endless loop 150 includes first and second elongate bars positioned to be substantially parallel to each other, the first elongate bar 162 forming an upper portion of the endless loop, and the second elongate bar 164 forming a lower portion of the endless loop. The first and second bars 162 and 164 are positioned along the path of the endless loop 150 such that when the ramp portion 120 reciprocates between the stowed and deployed positions, the first and second bars travel in parallel, but opposite directions.

As best shown in FIG. 9, an upper biasing element 166 is coupled to the upper elongate bar 162 and extends in a downward direction. First and second engagement surfaces 170 and 172 are disposed on opposing sides of the upper biasing element 166. In the illustrated embodiment, the first and second engagement surfaces 170 and 172 comprise recesses formed in the inboard and outboard edges, respectively, of the upper biasing element 166. The first and second engagement surfaces 170 and 172 are sized and configured to engage opposing springs, described below.

Still referring to FIG. 9, a lower biasing element 168 is coupled to the lower elongate bar 164 and extends in an upward direction. First and second engagement surfaces 174 and 176 are disposed on opposing sides of the lower biasing element 168 and, similar to the engagement surfaces 170 and 172 of the upper biasing element 166, are sized and configured to engage the opposing springs, described below.

When the ramp portion 120 reciprocates between the stowed and deployed positions, the upper and lower biasing elements 166 and 168 reciprocate in opposite directions along parallel paths. More specifically, the upper and lower biasing elements 166 and 168 travel along parallel inboard/outboard paths. The upper and lower biasing elements 166 and 168 are offset from each other in a forward/rearward direction. As a result, as the ramp portion 120 reciprocates between the stowed and deployed positions, the upper and lower biasing elements 166 and 168 travel past one another as they travel in opposing directions along their respective inboard/outboard paths.

In the illustrated embodiment, a single upper biasing element 166 extends downward from a central portion of the upper elongate bar 162, and separate lower biasing elements 168 extend upward from the forward and rear sides of the lower elongate bar 164. When the ramp portion 120 is in the neutral position, the upper and lower biasing elements 166 and 168 are aligned in the inboard/outboard direction, and the upper biasing element 166 is disposed between the lower biasing elements 168. As a result, the upper and lower biasing elements 166 and 168 are each capable of engaging each of the counterbalance springs, while being capable of bypassing each other when the ramp reciprocates between the deployed and stowed positions. It will be appreciated that the disclosed configuration is exemplary only and should not be considered limiting. In this regard, the number, position, shape, and other features of the bearing members can vary. Such variations are contemplated and should be considered within the scope of the present disclosure.

As shown in FIGS. 10-17, the counterbalance assembly 160 includes first and second opposing springs 190 and 200 fixedly secured relative to the frame 110 of the ramp assembly 100. The first and second springs 190 and 200 are positioned in a substantially horizontal position within the interior portion of the endless loop 150. As illustrated, the first and second springs 190 and 200 are a known gas spring having a rod slidingly extending from a cylinder that is fixedly secured to the frame 110. The first spring 190 is positioned so that the rod extends in the outboard direction and retracts into the cylinder in the inboard direction. The second spring 200 is positioned so that the rod extends in inboard direction and retracts into the cylinder in the outboard direction.

As best shown in FIG. 10, the first spring 190 has a clevis fitting 192 disposed on the end of the rod. A pin 194 extends laterally through the clevis fitting 192 and beyond the outer edges of each leg of the clevis fitting. Similarly, the second spring 200 includes a clevis fitting 202 disposed on the end of the rod with a pin 204 extending laterally through the clevis fitting 202 and beyond the outer edges of each leg of the clevis fitting. When the ramp portion 120 is in the neutral position (FIG. 11), the first and second springs 190 and 200 are in fully extended, i.e., relaxed, positions and the upper and lower biasing elements 166 and 168 are disengaged from the clevis fittings 192 and 202.

As shown in FIGS. 11 and 15-17, when the ramp portion 120 moves from the neutral position to the deployed position, the lower biasing elements 168 move toward the clevis fitting 192 until the engagement surfaces 174 of the lower biasing elements 168 engage the pin 194 that extends through the clevis fitting 192. In this regard, the forward lower biasing element 168 engages the portion of the pin 194 that extends from the forward side of the clevis fitting 192, and the rear lower biasing element 168 engages the portion of the pin 194 that extends from the rear side of the clevis fitting. The clevis fitting 192 itself is at least partially positioned between the lower biasing elements 168 when the lower biasing elements are engaged with the pin 194. With the lower biasing elements 168 so engaged with the pin 194, further movement of the ramp portion 120 toward the deployed position compresses the first spring 190. That is, the lower biasing elements 168 drive the rod of the first spring 190 into the cylinder. As a result, the first spring 190 provides a force that biases the ramp portion 120 toward the neutral position, i.e., away from the deployed position, thereby counteracting at least a portion of the moment $M_W$ imparted by the weight of the ramp portion.

Still referring to FIGS. 11 and 15-17, when the ramp portion 120 moves from the neutral position toward the deployed position, the upper biasing element 166 moves in the outboard direction until the upper biasing element engages the second spring 200. More specifically, the engagement surface 172 of the upper biasing element 166 engages the portion of the pin 204 that extends between the legs of the second clevis fitting 202. With the engagement surface 172 engaged with the pin 204, further movement of the ramp portion 120 toward the deployed position compresses the second spring 200. When compressed in this manner, the second spring 200 provides a force that biases the ramp portion 120 toward the neutral position, i.e., away from the deployed position. Similar to the force provided by the first spring 190, this force counteracts at least a portion of the moment imparted by the weight of the ramp portion 120.

Referring now to FIGS. 11-14, when the ramp portion 120 moves from the neutral position to the stowed position, the upper biasing element 166 moves in an inboard direction until the upper biasing element 166 engages the first spring 190. More specifically, the first engagement surface 170 of the upper biasing element 166 engages the pin 194 that extends through the clevis fitting 192 of the first spring 190. With the upper biasing element 166 engaged with the first spring 190, further movement of the ramp portion 120 toward the stowed position compresses the first spring so that the first spring provides a force to counteract the moment imparted by the weight of the ramp portion.

Still referring now to FIGS. 11-14, as the ramp portion 120 moves from the neutral position to the stowed position, the lower biasing elements 168 move in an outboard direction until the lower biasing elements 168 engage the second spring 200. The second engagement surfaces 176 of the lower biasing elements 168 engage the pin 204 that extends through the clevis fitting 202 of the second spring 200. With the lower biasing elements 168 engaged with the second spring 200, further movement of the ramp portion 120 toward the stowed position compresses the second spring so that the second spring provides a force to counteract the moment imparted by the weight of the ramp portion.

As described above, the first and second springs 190 and 200 are both compressed (1) when the ramp portion 120 moves from the neutral position to the stowed position, and (2) when the ramp portion moves from the neutral position to the deployed position. When the ramp portion 120 moves from the neutral position to the stowed position, the upper biasing element 166 compresses the first spring 190, and the lower biasing elements 168 compress the second spring 200. Conversely, when the ramp portion 120 moves from the neutral position to the deployed position, the upper biasing element 166 compresses the second spring 200, and the lower biasing elements 168 compress the first spring 190. As a result, the first and second springs 190 and 200 cooperate to provide a counterbalancing force that biases the ramp portion 120 toward the neutral position, regardless of the location of the ramp portion.

The illustrated embodiment of the counterbalance is advantageous in that the use of multiple springs allows for the use of smaller, more compact springs. In addition, by varying the engagement and disengagement of the biasing elements with the springs, an overall counterbalancing moment $M_F$ that closely matches the generally sinusoidal moment $M_W$ imparted by the weight of the ramp portion 120 can be achieved.

Figure 11:
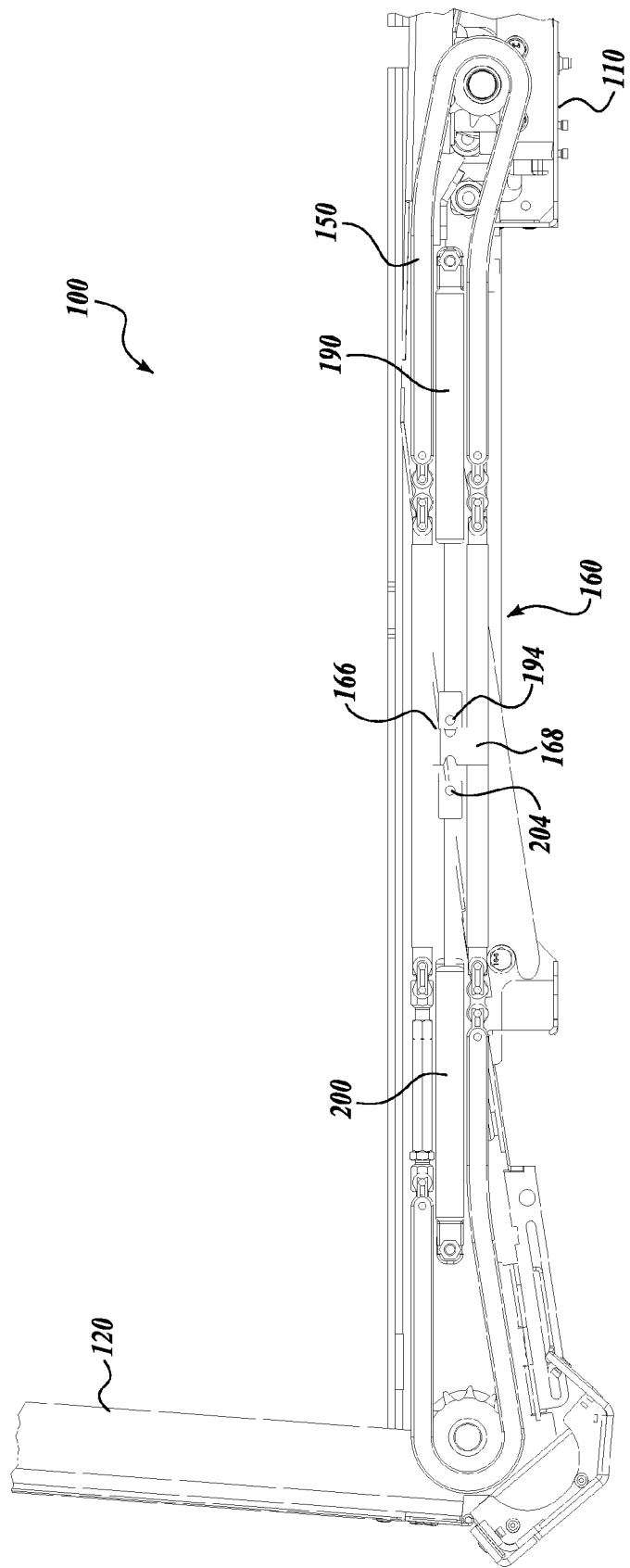
FIG. 11 shows a side view of counterbalance assembly of FIG. 1 with the ramp portion located in the neutral position.
Figure 12:
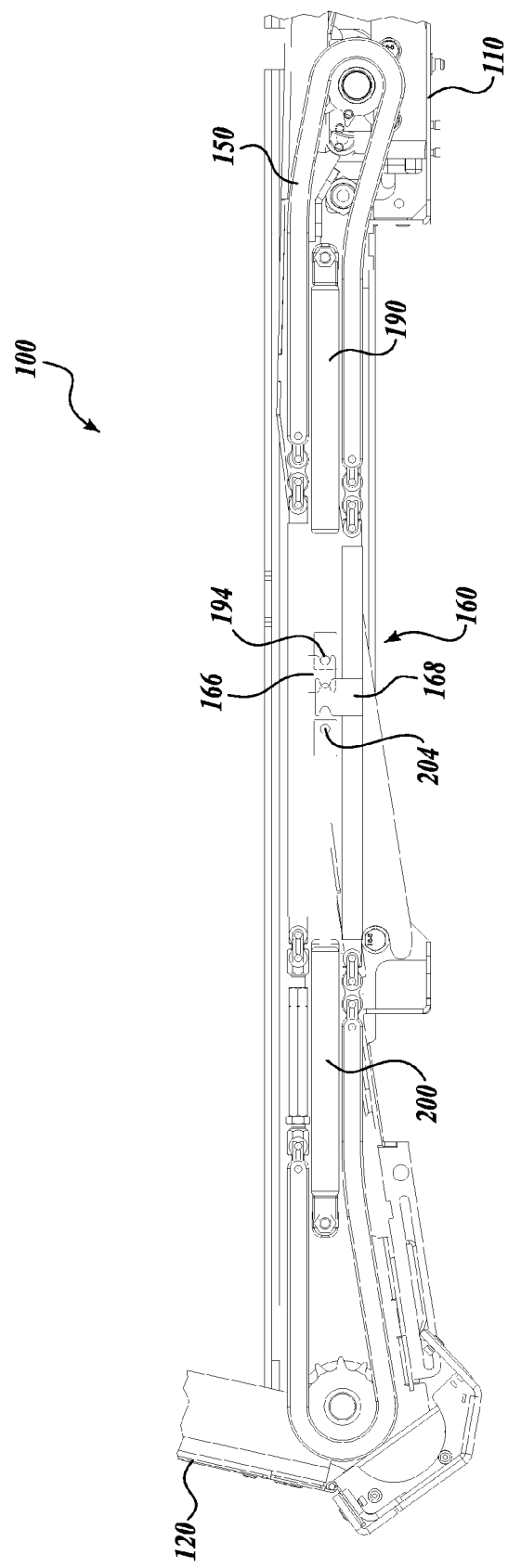
FIG. 12 shows a side view of the counterbalance assembly of FIG. 11 with the ramp portion located in a first engagement position.
Figure 13:
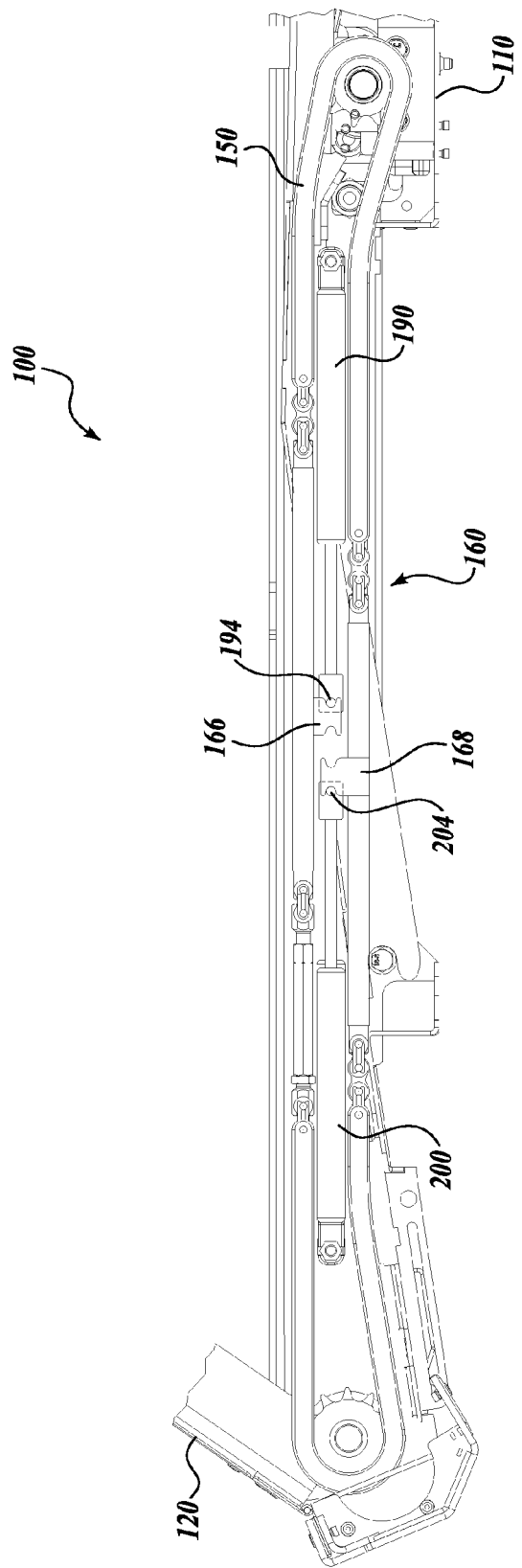
FIG. 13 shows a side view of the counterbalance assembly of FIG. 11 with the ramp portion located in a second engagement position.
Figure 14:
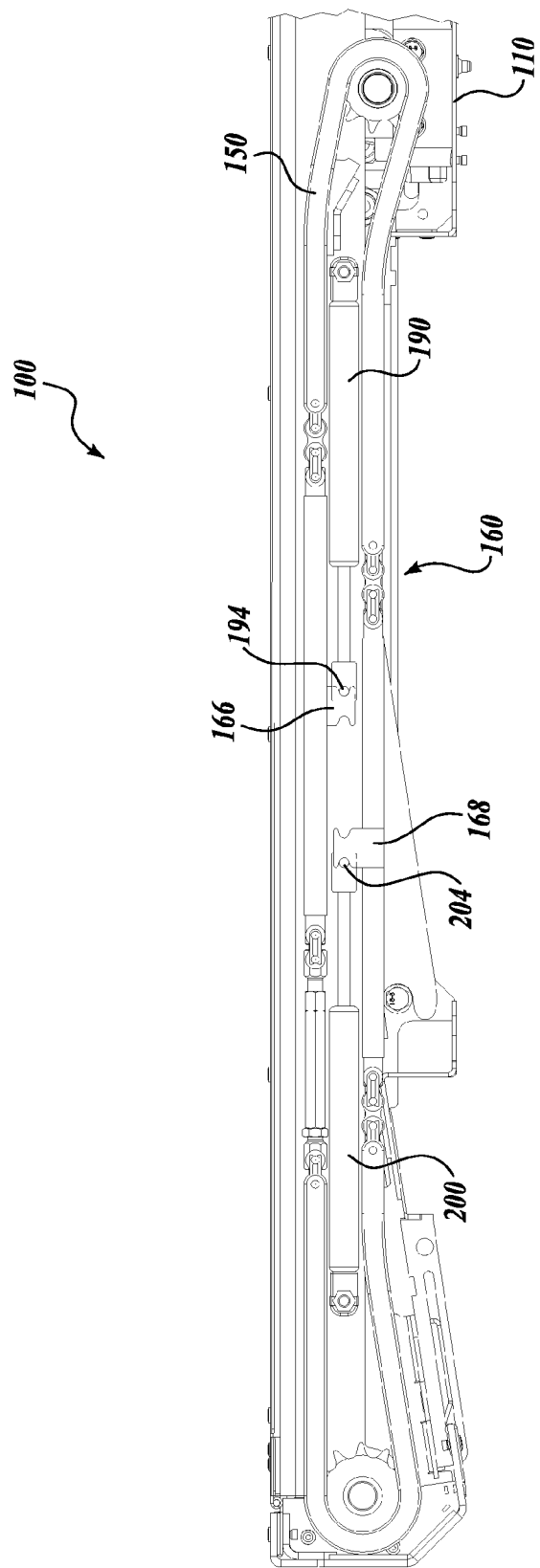
FIG. 14 shows a side view of the counterbalance assembly of FIG. 11 with the ramp portion located in the stowed position.
Figure 15:
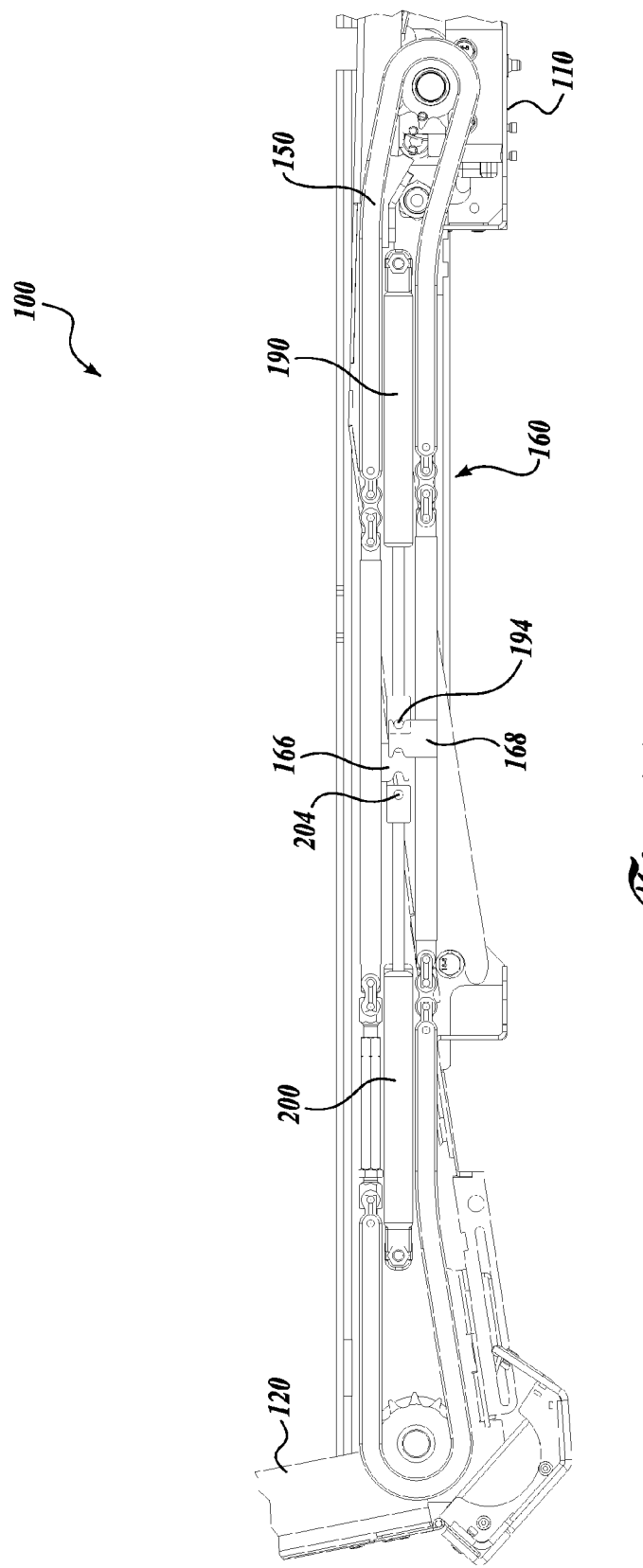
FIG. 15 shows a side view of the counterbalance assembly of FIG. 11 with the ramp portion located in a third engagement position.
Figure 16:
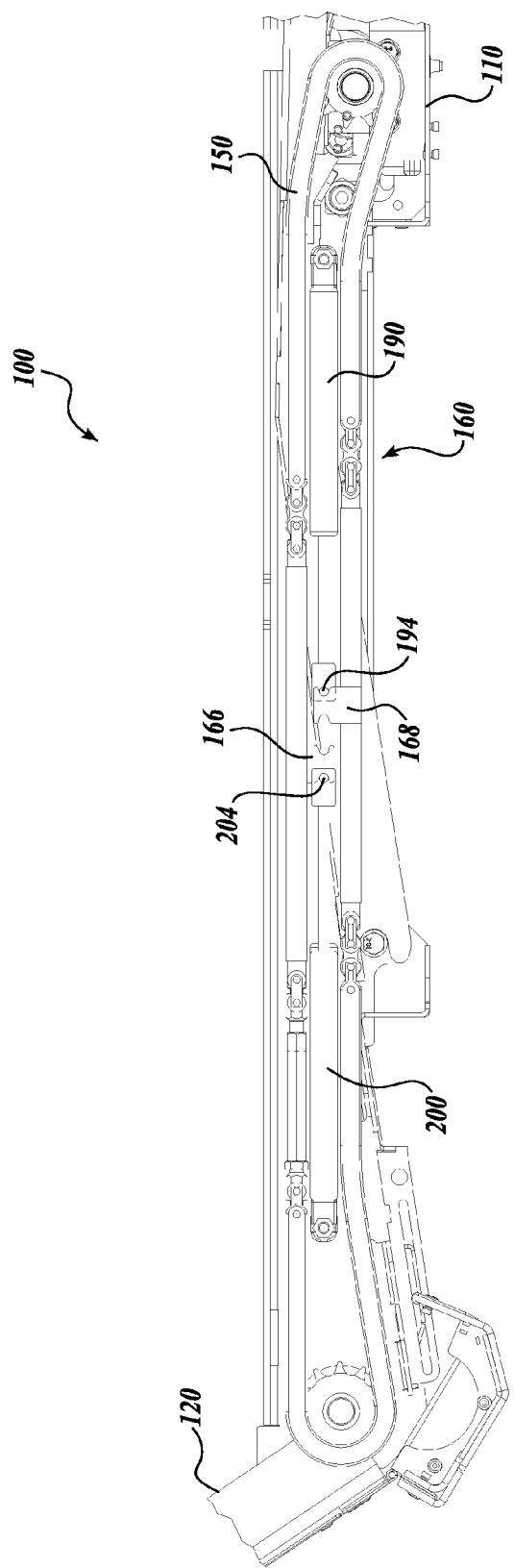
FIG. 16 shows a side view of the fold out ramp of FIG. 11 with the ramp portion located in a fourth engagement position.
Figure 17:
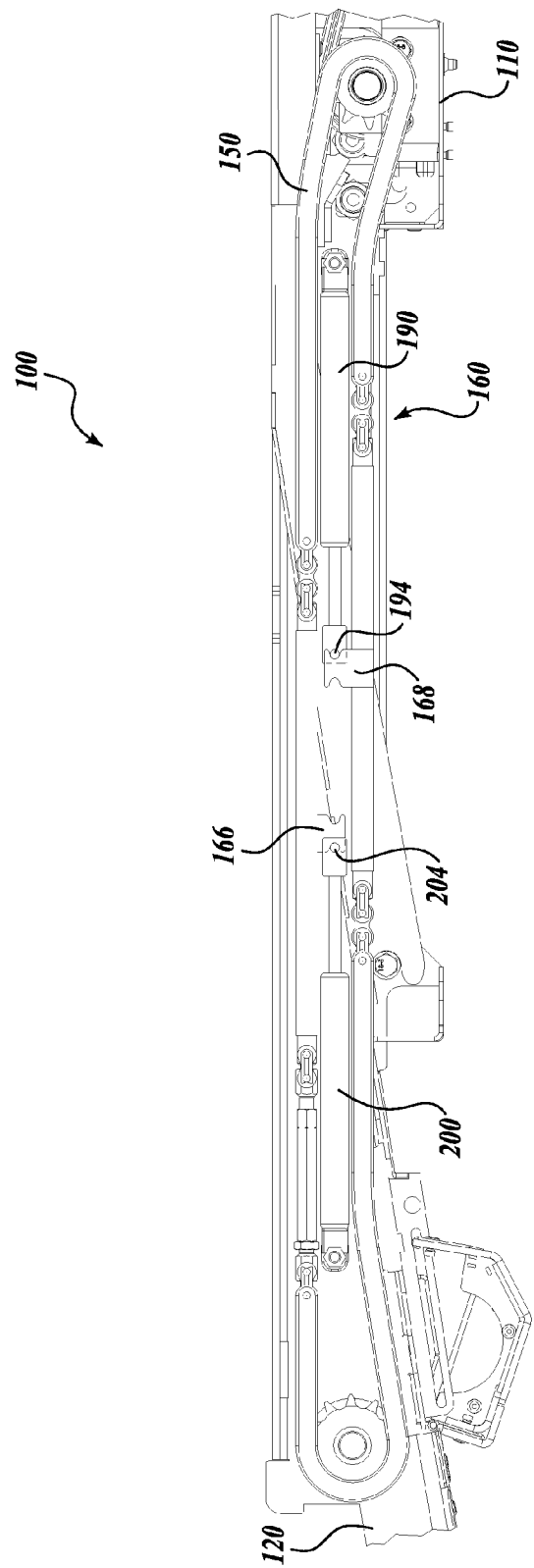
FIG. 17 shows a side view of the counterbalance assembly of FIG. 11 with the ramp portion located in the deployed position.

In the illustrated embodiment, the counterbalance is configured so that the first and second springs 190 and 200 are disengaged from the upper and lower biasing elements 166 and 168 when the ramp is in the neutral position (FIG. 11). As a result, the springs provide no counterbalancing force to the ramp portion 120.

As the ramp portion 120 moves from the neutral position toward the stowed position, the upper biasing element 166 moves toward the first spring 190, and the lower biasing elements 168 move toward the second spring 200. In the illustrated embodiment, the ramp portion 120 moves through a first engagement position, shown in FIG. 12, wherein the upper biasing element 166 is first engaged with the first spring 190. When the ramp portion is in the first engagement position, the lower biasing elements 168 are still disengaged from second spring 200. From the first engagement position, the ramp portion 120 continues to move toward the stowed position through a second engagement position, shown in FIG. 13, in which the lower biasing elements 168 initially engage the second spring 200. The ramp portion 120 then continues from the second engagement position to the stowed position, shown in FIG. 14.

When the ramp portion 120 is located between the neutral position and the first engagement position, neither the first spring 190 nor the second spring 200 is engaged, and therefore, the counterbalance assembly 160 does not provide a counterbalancing force to counteract the moment $M_W$ imparted by the weight of the ramp portion. When the ramp portion 120 is located between the first and second engagement positions, the first spring 190 is engaged to provide a counterbalancing force, but the second spring 200 is not engaged and provides no additional force to supplement the counterbalancing force provided by the first spring. When the ramp portion is located between the second engagement position and the stowed position, both the first and second springs 190 and 200 are engaged and provide counterbalancing forces that bias the ramp portion 120 away from the stowed position, i.e., toward the neutral position.

As the ramp portion 120 moves from the neutral position toward the deployed position, the upper biasing element 166 moves toward the second spring 200, and the lower biasing elements 168 move toward the first spring 190. In the illustrated embodiment, the ramp portion 120 moves through a third engagement position, shown in FIG. 15, wherein the lower biasing elements 168 first engage the first spring 190. When the ramp portion is in the third engagement position, the upper biasing element 166 is still disengaged from second spring 200. From the third engagement position, the ramp portion 120 continues to move toward the deployed position through a fourth engagement position, shown in FIG. 16. As the ramp portion 120 reaches the fourth engagement position, the upper biasing element 166 engages the second spring 200. The ramp portion 120 then continues from the fourth engagement position to the deployed position, shown in FIG. 17, with the first and second springs 190 and 200 engaged.

When the ramp portion 120 is located between the neutral position and the third engagement position, neither the first spring 190 nor the second spring 200 is engaged, and therefore, the counterbalance assembly 160 does not provide a counterbalancing force to counteract the moment $M_W$ imparted by the weight of the ramp portion. When the ramp portion 120 is located between the third and fourth engagement positions, the first spring 190 is engaged to provide a counterbalancing force, but the second spring 200 is not engaged and provides no additional force to supplement the counterbalancing force provided by the first spring. When the ramp portion is located between the fourth engagement position and the deployed position, both the first and second springs 190 and 200 are engaged and provide counterbalancing forces that bias the ramp portion 120 away from the deployed position, i.e., toward the neutral position.

In the illustrated embodiment, the moment $M_W$ imparted by the weight W of the ramp portion 120 is counteracted by the first and second springs 190 and 200. As described above, movement of the ramp portion 120 from the neutral position drives the rod of the first spring 190 into the cylinder, which remains in a fixed location. Similarly, movement of the ramp portion 120 from the neutral position drives the rod of the second spring 200 into the cylinder, which also maintains a fixed location. The resulting forces, combined with the forces provided by the springs on the rear portion 144 of the counterbalance assembly 160, imparts the moment $M_F$ to resist the moment $M_W$ that results from the weight W of the ramp portion 120.

Gas springs, such as the ones described, have an initial spring force that must be overcome by the force applied to the spring rod before the spring begins to compress. Once the initial spring force is overcome, the spring begins to compress, i.e., the rod begins to move into the cylinder. While the spring is being compressed, the resistive force provided by the spring increases at a rate that is approximately proportional to the amount of travel of the rod, i.e., the spring behaves as a linear spring. Accordingly, by delaying engagement of the first and second springs 190 and 200 as the ramp portion 120 moves from the neutral position toward either the stowed position or the deployed position, a net resistive force supplied by the springs 190 and 200 can be achieved such that the moment $M_F$ more closely approximates the sinusoidal moment $M_W$.

The springs 190 and 200 of the counterbalance assembly 160 are preferably selected to minimize the difference between the force supplied by the springs 190 and 200 and the force required to counteract the moment $M_W$ as the ramp portion 120 reciprocates between a stowed position and a deployed position. As previously noted, once the initial spring force is overcome, the disclosed gas springs are generally linear, i.e., the increase in spring force is approximately proportional to the change in displacement of the rod. For such springs, the initial spring force and spring rate can be selected such that the total resistance provided by the springs is a best fit of the sinusoidal increase of the moment $M_W$. Moreover, springs having different initial spring forces and spring rates can be used to more effectively minimize the difference between $M_W$ and $M_F$.

It will be appreciated that the disclosed counterbalance is not limited to the use of gas springs. In this regard, alternate types of springs, such as coil springs or hydraulic springs, or various combinations of suitable springs, can also be used, and the inclusion of such springs and spring combinations should be considered within the scope of the present disclosure.

In other contemplated embodiments, non-linear springs are used so that the resistance supplied by the spring increases at a non-linear rate, allowing the spring resistance to match more closely the force required to resist the moment $M_W$ as the ramp portion 120 reciprocates between a stowed position and a deployed position. Non-linear springs are known in the art. For example, a spring formed with a variable coil pitch will exhibit non-linear properties. It should be understood that various known spring configurations providing linear or non-linear reactive forces can be included in the counterbalance assembly 160 without departing from the spirit and scope of the present invention. In addition, alternate systems can be used to provide a resistive force, such as pneumatic systems, hydraulic systems, and other systems known in the art.

It should be appreciated that the forward portion 142 and rear portion 144 of the counterbalance assembly 160 need not provide identical counterbalancing force profiles. In this regard, the type of springs and engagement timing of the springs between the front and rear portions of the counterbalance assembly 160 can be varied so that the net moment $(M_W-M_F)$ on the ramp portion 120 is minimized.

Because the ramp portion 120 typically rotates through a greater angle when traveling from the neutral position to the deployed position than it does when traveling from the neutral position to the stowed position, it may be advantageous to provide a counterbalance force profile that is asymmetrical about the neutral position. Put another way, the profile of the counterbalance force as the ramp travels from the neutral position to the deployed position is different from the profile as the ramp portion travels from the neutral position to the stowed position. Such an asymmetrical profile can be achieved by varying the positions of the upper and lower biasing elements 166 and 168 when the ramp portion 120 is in the neutral position.

While illustrative embodiments have been illustrated and described, it will be appreciated that various changes can be made therein without departing from the spirit and scope of the invention.

The embodiments of the invention in which an exclusive property or privilege is claimed are defined as follows:

1. A counterbalance for a ramp assembly, the ramp assembly having a ramp portion coupled for reciprocating movement between a stowed position, a neutral position, and a deployed position, the counterbalance comprising:
   (a) a transmission element forming an endless loop, the transmission element being operably coupled to the ramp portion to move in a first direction when the ramp portion moves toward the stowed position, and in a second direction opposite the first direction when the ramp portion moves toward a deployed position;
(b) first and second springs;
(c) a first biasing element coupled to the transmission element, the first biasing element compressing the first spring when the ramp portion moves from the neutral position to the stowed position, the first biasing element compressing the second spring when the ramp portion moves from the neutral position to the deployed position; and
(d) a second biasing element coupled to the transmission element, the second biasing element compressing the second spring when the ramp portion moves from the neutral position to the stowed position, the second biasing element compressing the first spring when the ramp portion moves from the neutral position to the deployed position.

2. The counterbalance of claim 1, wherein the first biasing element is disengaged from the first spring when the ramp portion is located between the neutral position and the deployed position.

3. The counterbalance of claim 2, wherein the second biasing element is disengaged from the first spring when the ramp portion is located between the neutral position and the stowed position.

4. The counterbalance of claim 3, wherein the ramp portion has a first engagement position between the neutral position and the stowed position, wherein the first biasing element is disengaged from the first spring when the ramp portion is located between the neutral position and a first engagement position, and the first biasing element is engaged with the first spring when the ramp portion is located between the first engagement position and the stowed position.

5. The counterbalance of claim 4, wherein the second biasing element is disengaged from the second spring when the ramp portion is located between the neutral position and the first engagement position, and the second biasing element is engaged with the second spring when the ramp portion is located between the first engagement position and the stowed position.

6. The counterbalance of claim 4, wherein the ramp portion has a second engagement position between the stowed position and the first engagement position, wherein the second biasing element is disengaged from the second spring when the ramp portion is located between the neutral position and the second engagement position, and the second biasing element is engaged with the second spring when the ramp portion is located between the second engagement position and the stowed position.

7. The counterbalance of claim 6, wherein the ramp portion has a third engagement position between the neutral position and the deployed position, wherein the second biasing element is disengaged from the first spring when the ramp portion is located between the neutral position and a third engagement position, and the second biasing element is engaged with the first spring when the ramp portion is located between the third engagement position and the deployed position.

8. The counterbalance of claim 7, wherein the ramp portion has a fourth engagement position between the third engagement position and the deployed position, wherein the first biasing element is disengaged from the second spring when the ramp portion is located between the neutral position and the fourth engagement position, and the first biasing element is engaged with the second spring when the ramp portion is located between the fourth engagement position and the deployed position.

9. The counterbalance of claim 1, wherein the first and second springs are pneumatic springs.

10. The counterbalance of claim 1, wherein the first and second springs are hydraulic springs.

11. The counterbalance of claim 1, wherein the first and second springs are disposed within the endless loop.

12. The counterbalance of claim 11, wherein the first spring is coaxial to the second spring.

13. A counterbalance for a ramp assembly, the ramp assembly having a ramp portion coupled for reciprocating movement between a stowed position, a neutral position, and a deployed position, the counterbalance comprising:
(a) a transmission element forming an endless loop, the transmission element being operably coupled to the ramp portion to move in a first direction when the ramp portion moves toward the stowed position, and in a second direction opposite the first direction when the ramp portion moves toward a deployed position;
(b) first and second springs;
(c) a first biasing element coupled to the transmission element, the first biasing element moving a first end of the first spring toward a second end of the first spring when the ramp portion moves from the neutral position to the stowed position, the first biasing element moving a first end of the second spring toward a second end of the second spring when the ramp portion moves from the neutral position to the deployed position; and
(d) a second biasing element coupled to the transmission element, the second biasing element moving the first end of the second spring toward the second end of the second spring when the ramp portion moves from the neutral position to the stowed position, the second biasing element moving the first end of the first spring toward the second end of the first spring when the ramp portion moves from the neutral position to the deployed position.

14. The counterbalance of claim 13, wherein movement of the ramp portion toward the stowed position moves the first biasing element in a first direction and the second biasing element in a second direction opposite the first direction.

15. The counterbalance of claim 14, wherein movement of the ramp portion toward the deployed position moves the first biasing element in the second direction and the second biasing element in the first direction.

16. The counterbalance of claim 13, wherein the first and second springs are disposed within an interior portion of the endless loop.

17. The counterbalance of claim 16, the endless loop comprising:
(a) a lower portion defining a first linear path; and
(b) an upper portion defining a second linear path.

18. The counterbalance of claim 17, wherein the first biasing element is coupled to the upper portion of the endless loop, and the second biasing element is coupled to the lower portion of the endless loop.

19. The counterbalance of claim 17, wherein the first linear path is substantially parallel to the second linear path.

20. The counterbalance of claim 17, wherein the first spring is coaxial to the second spring.

* * * * *